(No Model.)
2 Sheets—Sheet 1.
T. DANIELS.
Machine for Cutting Pills.
No. 236,214. Patented Jan. 4, 1881.
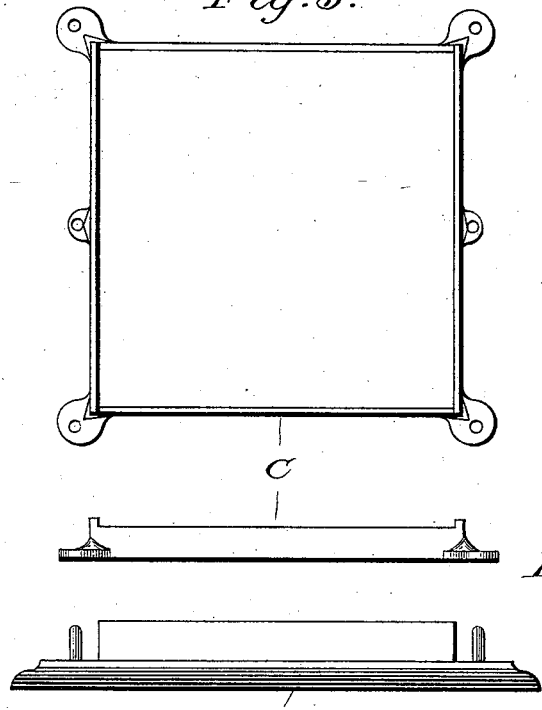
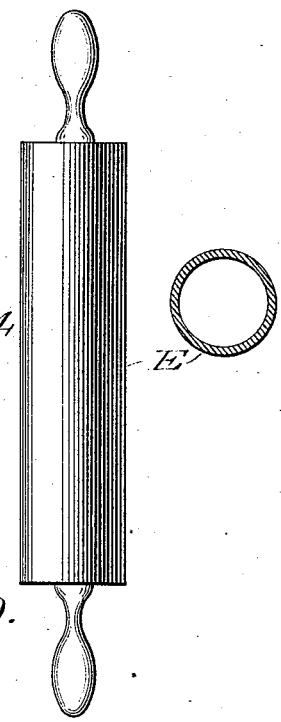
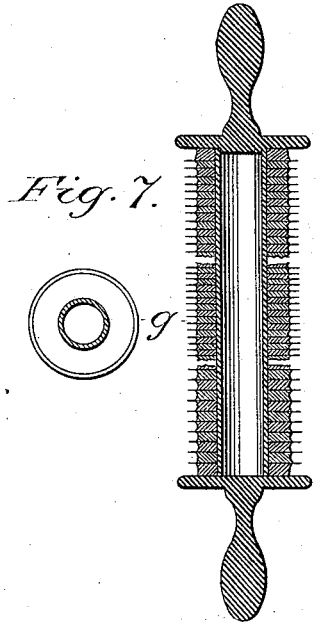
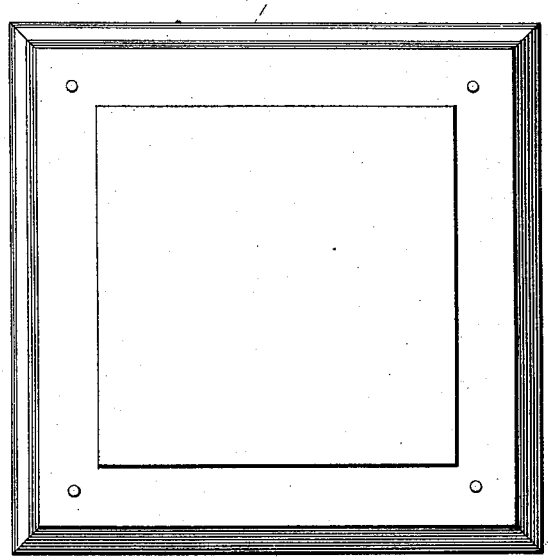
Witnesses:
Edward Heffron
J. A. Sanford.
Inventor.
Thomas Daniels (No Model.) 2 Sheets—Sheet 2.
T. DANIELS.
Machine for Cutting Pills.
No. 236,214. Patented Jan. 4, 1881.
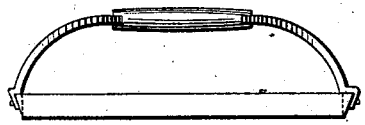
Fig. 5.
Fig. 8.
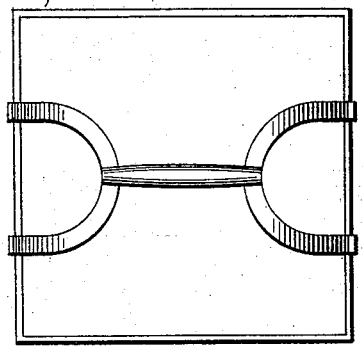
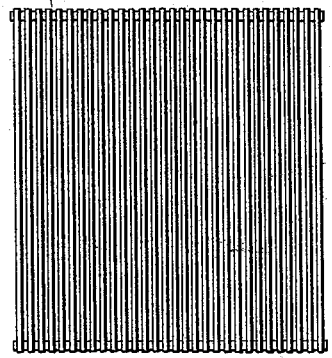
Fig. 2.
Fig. 6.
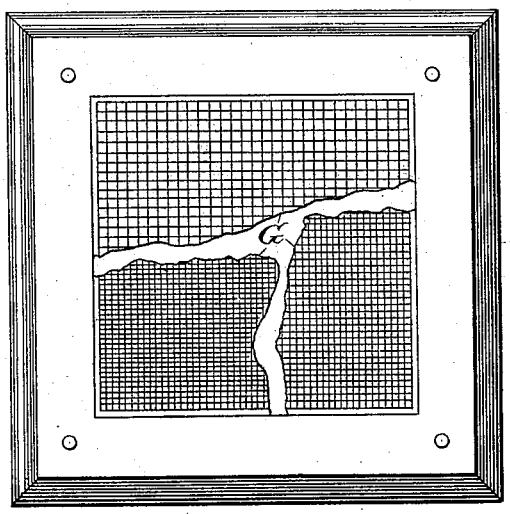
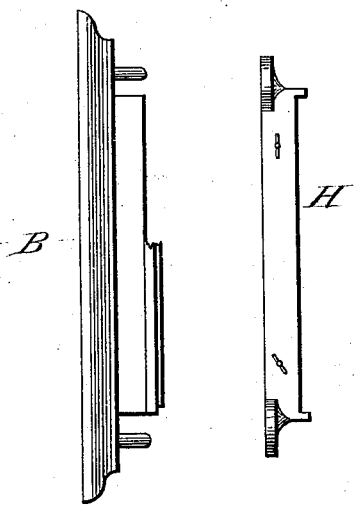
Witnesses:
Edward Heffron
J. A. Sanford.
Inventor
Thomas Daniels

UNITED STATES PATENT OFFICE.

THOMAS DANIELS, OF TOLEDO, OHIO.

MACHINE FOR CUTTING PILLS.

SPECIFICATION forming part of Letters Patent No. 236,214, dated January 4, 1881.

Application filed September 18, 1880. (No model.)

To all whom it may concern:

Be it known that I, THOMAS DANIELS, of the city of Toledo, in the county of Lucas and State of Ohio, have invented a new and useful Machine for Cutting Pills in Quantity and of Uniform Size; and I do hereby declare that the following is a full, clear, and exact description of the construction and operation of the same, reference being had to the annexed drawings, making a part of this specification, in which each separate part or section is designated by a letter.

It consists of several sections, each holding a relation to the other and making one harmonious whole. The description of the drawings is as follows:

Figure 1 is a base and section. Fig. 2 is a base and section, showing a plan in three sections of a plate with numerous cells. Fig. 3 is a movable frame with section. Fig. 4 is a plan of rolling-pin with section. Fig. 5 is a cutting-frame and elevation section. Fig. 6 is a section of a movable frame to be used on base, Fig. 2. Fig. 7 is a plan of a roller-cutter and section. Fig. 8 is a plan of strips and a section showing the method of attachment to the movable frame, Fig. 7. Fig. 9 is a plan of rings or washers.

A is a base and section. It is made of cast-iron or other suitable material. The base-mold is about thirteen and a half inches square. A square center about ten and a half inches square on the top is raised one inch above the outside molding. At each corner of the base is a stationary pin about one-half inch (more or less) in height. Above the molding of the base the surfaces are all finished to true surfaces.

B is a base and section. It is made of cast-iron or other suitable material, and is nearly the same as the preceding one, but of smaller dimensions. The base-molding is about twelve inches square. The raised center is about three-eighths of an inch in height above the molding, and is about nine and three-eighths inches square. Stationary pins are provided at each corner. All the surfaces above the base-molding are finished to true surfaces.

C is a square movable frame and section, made of wrought-iron or any other suitable metal. It is about ten and three-eighths inches square in the clear, one inch in height on the two sides, and three-fourths inch high (more or less) on both ends, three-eighths inch thick, and provided with lugs on the outside of each of the corners, with a hole in each lug. Also, at c c on the two sides of the frame, at the bottom of the sides of the frame, are lugs with set-screws to screw downward. The top of the two sides of the frame, on the side on which the lugs with the set-screws are, is finished to a true surface, and made true to correspond with the under sides of the lugs at the corners, resting on the pins as the base of measurement. The top of these two sides serves as a runway upon which the rolling-pin is worked. The holes in the lugs on the corners are to rest upon the pins in the corners of the base A. The corners can be raised to any desired height by the use of suitable small rings or washers upon the pins under the lugs on the corners. When the corners are raised by the use of the rings or washers the set-screws on the sides of the frame are screwed downward, so as to touch the horizontal finished surface of the base A on the same level with the pins at the corners. It is to give support to the sides of the frame to prevent it from bending downward while in use.

E is a rolling-pin and section. It is made of brass, iron, or any other suitable material. It is about thirteen inches in length, provided at each end with turned handles. The diameter is three inches, more or less. It is made hollow, so as to avoid too much weight. The handles screw into the inside of the tube at one or both ends, or it may be made solid at one end.

F is a square cutting-frame and section. It is about nine inches and one-fourth square in the clear, or one-fourth of an inch larger than the cells of the celled plate. It is one inch in height. The thickness of the knives is one-eighth of an inch, more or less. On the bottom the knives are sharpened to a cutting-edge. It is provided with a handle on the top, fastened to the sides of the frame at the top. It is made of steel and iron or any other suitable metal.

G is a plate in three sections, showing numerous consecutive cells of three different sizes. The cells are made square at the top, and downward are an inverted pyramid, or any other desired shape. In depth they vary from about one-sixteenth to three-sixteenths of an inch, more or less, according to the size of the square surface of the cells. In ordinary use three or four plates with different sizes of cells will be required. Each plate will require one uniform size of cells. It is shown in position on the top of the base B B.

H is a section of a square movable frame, to be used on the base B. It is similar in construction to the movable frame C, but of smaller dimensions, being about nine inches and three-eighths (more or less) in the clear. It is provided with lugs at each of the corners, with a hole in each lug to rest on the pins in the corners of the base B B. The two sides of the frame are about one inch in height. The top is made true, taking the under side of the lugs at the corners as the base of measurement. The under sides of the frame are also true, and are to rest upon the base B on the finished surface on the same level with the pins, with the corners or lugs resting on the pins in the base. The two ends of the frame are about three-fourths of an inch (more or less) in height, leaving an offset at the top, so as to be out of the way of the knives of the roller-cutter I. It is intended, as a rule, to use the frame without the rings or washers under the lugs on the corners. It may at times become necessary to elevate the frame, when the rings or washers will be required to be used.

I is a roller-cutter and section. It consists of handles and flanges or guides at each end, and a hollow tube nearly ten inches in length, about one inch and a half (more or less) in diameter. It is made of brass or other substance. The tube and flange are made in one piece at one end, and at the other end of the tube the flange or guide is made to screw into the inside of the tube. The roller-cutter also consists of disks of steel and brass, say the steel disks three inches and one-fourth (more or less) in diameter, and the brass disks three inches (more or less) in diameter, with holes in each of the disks one and a half inch in diameter, more or less, or of just sufficient size to slip onto the outside of the brass tube. The steel and the brass disks are set upon the tube alternately. When the handle and flange or guide are screwed into the tube they will hold the disks firmly in their places. The steel disks being of larger diameter than the brass disks allows the steel disks to project about one-eighth of an inch (more or less) beyond the brass disks. The steel disks are sharpened to a cutting-edge. They are made of thin sheet-steel. The brass disks are made of a thickness to make grooves between the steel disks or cutters to correspond with the size of the cells in the celled plate with which they are to be used. The width of the grooves, or the distance between the steel disks, may be changed by substituting brass disks of such thickness as to make the grooves match the size of the cells in the celled plate to be used with it. The diameter of the shoulder which is to work upon the runway of the movable frame H is of a trifle less diameter than the disks. When the disks are formed into a roller-cutter the flanges or guides at each end are made to fit on the outside of the movable frame H. The roller-cutter can then be rolled forward and backward over such size of the cells in the celled plate G G G as it may have been adjusted to fit. The steel disks, if desired, may be substituted with any other metal or substance that experience may show to be capable of holding an edge sharp enough for the purpose required. The brass disks can also be substituted with any metal or material that can be made to answer a similar purpose of the brass—that is, to fill up the space between the cutting-disks.

J is an attachment of pieces of brass or any other suitable material, strips of steel, or other suitable substance, to the movable frame H. The pieces of brass or other material are about nine inches (more or less) in length, seven-eighths of an inch (more or less) in width, one-eighth to one-fourth of an inch thick. A slot is cut on the under side near each end. They are made to rest upon screws projecting from the ends of the movable frame H, while a nut is made to screw up against the attachment, holding it firmly in its place. On the upper side of the pieces attached to the frame H it is cut away so as to form notches, which are to be of the same width of the cells in the celled plate. The projection upward of the notches will be square on the top of each of the notches. From the top of each of the notches, secured on each end of the frame H, strips of steel or other suitable material are stretched across and securely fastened to the upward projection of the notches. If the celled plate is in position on the base B, the strips will partially cover each of the cells in the celled plate. The object of the strips is, when the cake of pill-mass is laid on the celled plate the strips will hold the pill-cake in its place over the cells while the cake is being cut by the roller-cutter. In the absence of these strips the pill-cake would be lifted up from the celled plate and become attached to the roller-cutter.

K is a small round ring or washer of metal, leather, or any other suitable material, and of such thickness as the purposes for which they are to be used may require. They are to be used on the pins of the base A and under the lugs on the corners of the movable frame C, so as to lift the corners of the movable frame C to any desired height. Occasionally they may also be wanted in elevating the frame H on the pins of the base B.

In cutting pills with this apparatus the frame C is to rest upon the pins on the corners of the base A. A ring or washer of the thickness of the pill-cake desired is placed upon the pins on the corners of the base A under the lugs on the corners of the movable frame C. The set-screws on the sides of the frame are screwed downward to touch the base A. A piece of pill-mass of sufficient size is, by the use of the rolling-pin E, rolled to a thin cake. It must be rolled until the cake is as thin as it can be rolled, which will then be of the exact thickness of the rings or washers under the lugs at the corners of the movable frame C. The edges of the pill-cake will be irregular in shape and of larger dimensions than required. To make it of the required size the square cutting-frame F is made to cut it into a square cake of about nine and one-fourth inches square. The cake is then transferred, for cutting into the size required for each pill, to the celled plate G. The celled plate now rests upon the top of the base B. The frame H is placed in position upon the pins. The frame also has attached to it the strips to hold the pill-mass in its place on the cells of the celled plate. The roller-cutter I is then made to go forward and backward on the frame H and over the celled plate G. The roller-cutter is kept in its exact position by the flanges or guides at each end of the cutter. The knives of the roller-cutter are intended to cut nearly through the pill-cake, or as close to the top of the celled plate as can be done and not touch it. The movable frame is then turned one-fourth round on the pins on the corners of the base. The roller-cutter is then moved forward and backward, so as to cut the cake crosswise. The pills are thus cut to a uniform size, and are ready to be removed to the finishing apparatus to be made round and smooth.

The different sizes of the celled plates and disks of the roller-cutter are made to cut about one thousand (more or less) of the large, about one thousand four hundred and fifty medium, and about two thousand of the small-size pills out of each cake that is cut. It requires but a few minutes of time to roll a cake and to cut it into the squares or cubes. These squares or cubes are to be transferred to the finishing apparatus, and by the method described are to be made round and smooth.

The finishing apparatus is designed as an appendage to the apparatus above described.

I am aware that roller-cutters similar to the one hereinbefore described, composed of alternate cutting-disks of steel and space-disks of brass or other material, have been used in the manufacture of confectionery, and that strips of metal to operate between such cutting-disks to prevent the material to be operated upon from adhering to the cutting-roller have also been used in the manufacture of confectionery; and I do not broadly claim such devices as of my own invention, neither do I broadly claim the rolling-pin, Fig. 4, as such device is old.

Having fully explained my invention, what I desire to claim, and to secure in Letters Patent of the United States, is—

1. In a pill-machine, the base A, constructed as described, in combination with the movable frame C and the rings or washers K, substantially as and for the purpose described.

2. In a pill-machine, the base B, constructed as described, in combination with the movable frame H and the rings or washers K, substantially as and for the purpose set forth.

3. In a pill-machine, the rolling-pin E, in combination with the base A, the movable frame C, and the rings or washers K.

4. In a pill-machine, the cutting-frame F, for cutting the sheet of pill-mass into a square cake, for the purpose described.

5. In a pill-machine, the plate G with numerous consecutive cells, for the purposes specified.

6. In a pill-machine, the strips of metal or other substance, J, with their attachments, in combination with the roller-cutter I, the movable frame H, and the celled plate G, when used as and for the purpose set forth.

7. In a pill-machine, the combination of the base B with the movable frame H, the celled plate G, the strips and attachments J, and the roller-cutter I, for the purposes described.

THOMAS DANIELS.

Witnesses:
EDWARD HEFFRON,
JAS. A. SANFORD.